United States Patent [19]

Martinsons

[11] Patent Number: 4,490,804

[45] Date of Patent: Dec. 25, 1984

[54] SELF-CORRECTING THROTTLE POSITION SENSING CIRCUIT

[75] Inventor: Robert Martinsons, Chicago, Ill.

[73] Assignee: Motorola, Inc., Schaumburg, Ill.

[21] Appl. No.: 373,840

[22] Filed: May 3, 1982

[51] Int. Cl.$^3$ ........................ G06F 15/20; H04L 25/06

[52] U.S. Cl. .................................... 364/571; 123/479; 364/431.12

[58] Field of Search .............. 364/571, 431.05, 431.06, 364/431.10, 431.11, 431.12; 123/479

[56] References Cited

U.S. PATENT DOCUMENTS

| | | | |
|---|---|---|---|
| 4,140,874 | 2/1979 | Thomas | 364/571 X |
| 4,181,944 | 1/1980 | Yamauchi et al. | 364/571 |
| 4,254,469 | 3/1981 | Whitely | 364/571 |
| 4,303,984 | 12/1981 | Houvig | 364/571 |
| 4,337,516 | 6/1982 | Murphy et al. | 364/571 |
| 4,366,541 | 12/1982 | Mouri et al. | 364/571 X |

*Primary Examiner*—Felix D. Gruber
*Attorney, Agent, or Firm*—Margaret M. Parker; James S. Pristelski; James W. Gillman

[57] ABSTRACT

Any offset error in the throttle position sensor reading of a fuel injection circuit can be corrected by determining the actual reading at a time when the reading should correctly be zero, then adjusting subsequent readings by the error figure. The error calculation is continually updated during periods of nearly-closed throttle, and is maintained between such periods. If the error exceeds a limit value, an "error" signal is provided.

5 Claims, 3 Drawing Figures

SELF-CORRECTING THROTTLE POSITION SENSING CIRCUIT

BACKGROUND OF THE INVENTION

This invention relates to the field of position sensor error and, more particularly, to a self-correcting sensing circuit for throttle position sensing in a fuel injection system.

In fuel injection control systems, one very important input signal is a measure of throttle position since it is an indication of driver demand. An accurate measure of throttle position is necessary for the correct calculation of both fuel delivery and spark advance. In some systems, the calculations of fuel injection quantity and the like are divided into defined groups, with "closed throttle" being one such group, "nearly-closed" being another group, and more open throttle being another. Since the system requirements in the closed throttle position are substantially different from the requirement of the nearly-closed, it is critical to have an accurate measurement of throttle position. If the position sensor is slightly misplaced, due to either manufacturing tolerances or to a subsequent misadjustment as from vibration, serious errors in control signals may occur. This mispositioning of the sensor may cause a reading that is either too high or too low with respect to the correct value, and the difference between the actual and correct readings may be interpreted as an error signal. It is also desirable to use this error signal to compensate the actual signal to bring it to its correct value. At the same time an alert signal may be provided indicating that service to the device is required if the error signal exceeds a predefined limit.

SUMMARY OF THE INVENTION

It is, therefore, an object of the present invention to provide a throttle position sensing circuit having a self-correcting feature.

It is a particular object to provide means for determining a highly accurate zero position sensor reading.

It is an additional object to provide an indication of a gross error in the throttle position reading.

These objects and others which will become apparent are obtained in a circuit according to the present invention wherein, each time the throttle position reading should be a "zero angle" or "closed throttle" reading, the value of the actual reading is stored in a memory as a correction factor. Subsequent readings of throttle position are adjusted by the stored value. The correction factor is updated each time the reading approaches the closed throttle reading. The correction factor is also continuously compared with a maximum allowable error signal and an alert signal is provided, indicating a possible need for service.

DETAILED DESCRIPTION OF A PREFERRED EMBODIMENT

Figure 1:
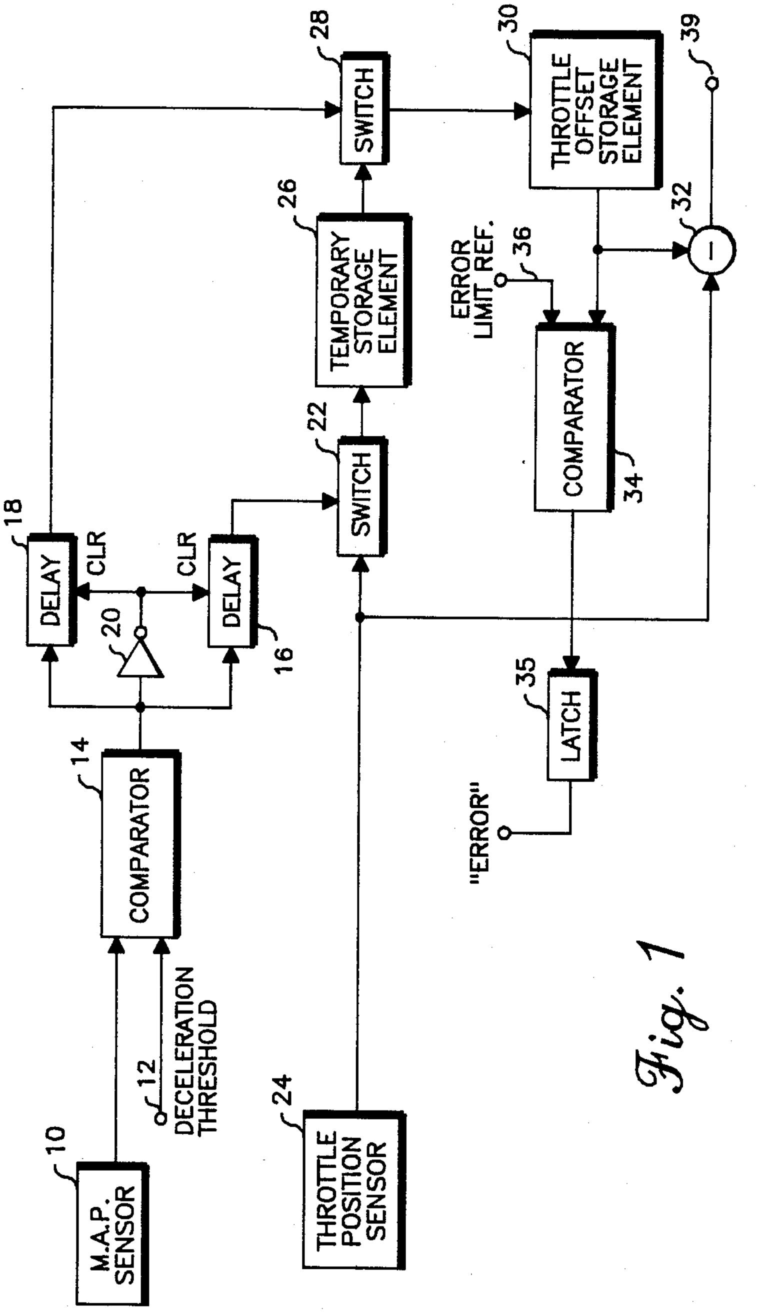
FIG. 1 is a block diagram of an embodiment of the invention.

The block diagram of FIG. 1 is a simplified drawing for easier understanding of the invention. A signal indicating the manifold absolute pressure (MAP) is provided by a first sensor 10. At an input terminal 12 a reference signal is received. This latter signal is termed a "deceleration threshold" signal and may be obtained from a suitable reference voltage source such as that seen in FIG. 2. The signals from the sensor 10 and the input terminal 12 are coupled to a comparator 14 whose output is coupled to a first delay circuit 16, to a second delay circuit 18 and to an inverter 20. The comparator 14 includes a small amount of hysteresis to prevent oscillation in the comparator output signal when the MAP signal from the sensor 10 exhibits minor excursions around the reference value at input 12. The output of the inverter 20 is coupled to clear the delay circuits 16, 18. The output of the delay circuit 16 is coupled to control a switching circuit 22. The signals being coupled through the switching circuit 22 come from a throttle position sensor 24 and are the throttle position readings which are to be corrected, if necessary. A temporary storage memory element 26 is coupled to the output of the switching circuit 22 and to the input of a second switching circuit 28. The switching circuit 28 is controlled by the output of the delay circuit 18. The delay in the second delay circuit 18 is greater than the delay in the delay circuit 16. The output of the switching circuit 28 is coupled to a second, semi-permanent storage element 30 where it is stored for use in a "subtractor" circuit 32. The input signals from the sensor 24, representing the measured throttle position, are also coupled to the subtractor 32. The output signal of the subtractor thus represents the measured throttle position minus any error. The corrected signal from the subtractor is coupled to other circuits requiring the throttle position measurement, such as the fuel delivery circuit and the spark advance circuit.

The output of the semi-permanent storage element 30 is also coupled to a second comparator 34, and compared therein with an error limit signal from a fourth input terminal 36. The output signal from the comparator 34 is coupled to a latch 35 which provides the "error" signal indicating that service may be required. Any "error" signal will therefore, be maintained until power is removed from the system, as by turning off the ignition switch.

To elaborate further on the operation of the elements mentioned above, the input signal at the terminal 24 represents a measure of throttle position which, if there is no position error, will be coupled unchanged, to the external circuitry to be used in subsequent calculations for fuel injection and the like. However, since the accuracy of the throttle position measurement is so critical, frequent comparisons are made to ensure an accurate measurement. Since in this embodiment the error measurement is made when the throttle should be closed, it is necessary to determine when that situation occurs. When the driver of a vehicle including the present system takes his or her foot off the accelerator pedal and thus closes the throttle, the vehicle will decelerate if it is moving and in gear. The throttling action, combined with the energy transfer into the engine through the drive train resulting from the momentum of the vehicle, will increase the vacuum level in the engine's intake manifold. This is due to the pumping action of the engine's pistons, and corresponds to a decrease in the MAP reading. The deceleration value of MAP is considerably lower than that experienced under the idle condition in which the throttle is also closed. The value of the deceleration threshold signal at 12 is set to correspond to a low value of MAP which can only occur during a substantial deceleration of the vehicle with the throttle completely closed (the "zero" position), the exact value depending on the design of the particular system.

Whenever the MAP reading at terminal 10 is lower than the reference threshold at the terminal 12 for a predetermined time, the system will update the error signal in the storage element 30. The switching circuit 22 will be activated by the output signal from the delay 16, allowing the measured throttle position signal (whether right or wrong) to be stored temporarily in the storage element 26. At the end of the delay in the second delay circuit 18, the switching circuit 28 will be activated and the value stored in the storage element 26 will replace the value previously stored in the storage element 30.

The second delay period and the temporary storage are not absolutely necessary to the functioning of the circuit but, in a practical embodiment, it is highly desirable to determine that the engine is truly in a "closed throttle" condition (hard deceleration) before storing and using a "correction factor". If the apparent closed throttle condition persists for one crankshaft revolution or more, it is quite likely to be authentic.

Since the value of the throttle position sensor measurement stored in the storage element 30 represents the actual angle measurement made at a time when the measurement should have indicated a closed throttle (zero angle), the stored value represents any error in the sensor reading.

When the value of the MAP rises above the threshold at the terminal 12, the output of the comparator 14 goes low, and the low output, through invertor 20, clears both of the delays 16, 18. Switching circuits 22, 28 are opened and the values stored in the storage elements 26, 30 remain unchanged. The value that remains in the storage element 30 is then used as a constant error factor, and is subtracted from the throttle position readings until a different error measurement is made.

Figure 2:
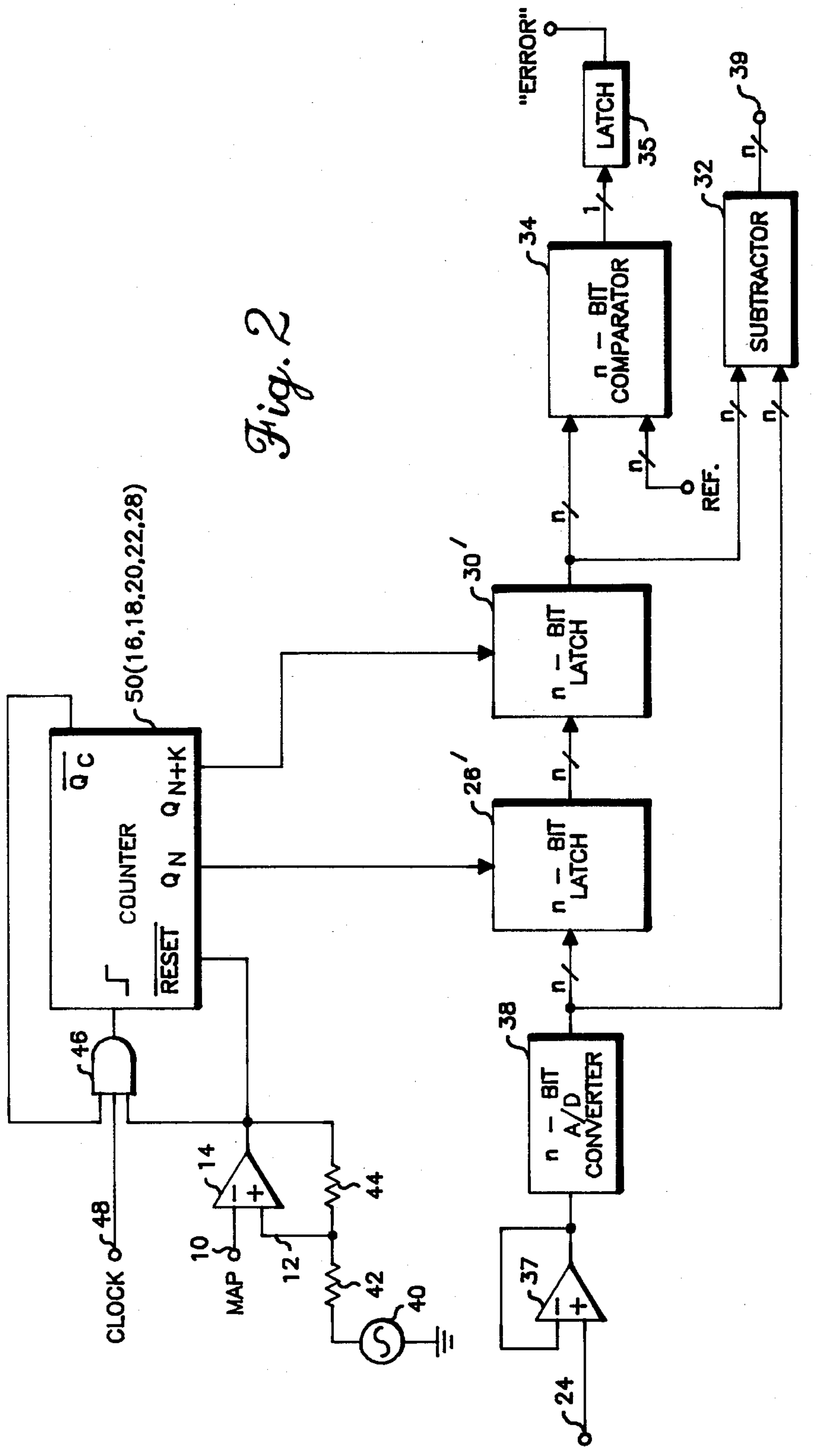
FIG. 2 is a block diagram of the invention directed to a specifically digital embodiment.

The block diagram of FIG. 2 is very similar to that of FIG. 1, but is directed toward a specific digital embodiment. For example, the throttle position sensor signal from terminal 24 is coupled through a buffer 37 to an n-bit A/D converter 38. The output of the A/D converter is indicated as having n lines and n lines are used thereafter, including the output 39 of the substractor 32. This parallel type of connection is not necessary to the invention but has certain advantages in some embodiments thereof.

The MAP input at terminal 10 is coupled to the comparator 14, as is the deceleration/threshold voltage from the terminal 12. In this embodiment a voltage source 40 is connected through a resistor 42 to the positive input of the comparator 14, with a resistor 44 providing a small amount of hysteresis. The comparator 14 output is coupled to one input of an AND gate 46 and a clock signal from another input terminal 48 is coupled to a second input of the AND gate. The clock signal could be derived from any time-based signal, but is preferably a crankshaft reference signal having 2 pulses per crankshaft revolution. Such a reference signal is utilized in many engine control circuits for engine speed and crankshaft angular position sensing and would, therefore, be available at no extra cost. The AND gate output provides the clock input signal for a counter 50. The comparator 14 output signal provides a RESET input for the counter 50, thus the counter is reset when the MAP signal exceeds the deceleration threshold. Three outputs of the counter are used, $Q_n$, $Q_{n+k}$ and $Q_c$, where $n<n+k<c$. $Q_n$ is coupled to control or clock the storage element 26' which is here shown as an n-bit latch. $Q_{n+k}$ is the clock input for storage element 30', which is also an n-bit latch. It will be seen, then, that the counter 50 provides the functions of the delay elements 16, 18, invertor 20 and switches 22 and 28 of FIG. 1. $Q_c$ is coupled back to a third input of the AND gate 46 and serves to inhibit further the clock input of the counter when counts have occurred. As before, the output signals of the storage element or latch 30' are coupled to an n-bit comparator 34 for comparison with a reference value from reference terminal 36. As before, the comparator 34 output is coupled through latch 35 to output terminal 39. The latch 30' output signals are also coupled to an arithmetic/logic unit 32', representing the subtractor 32. In the unit 32', the error factor from the storage element 30' is subtracted from each throttle position reading.

Figure 3:
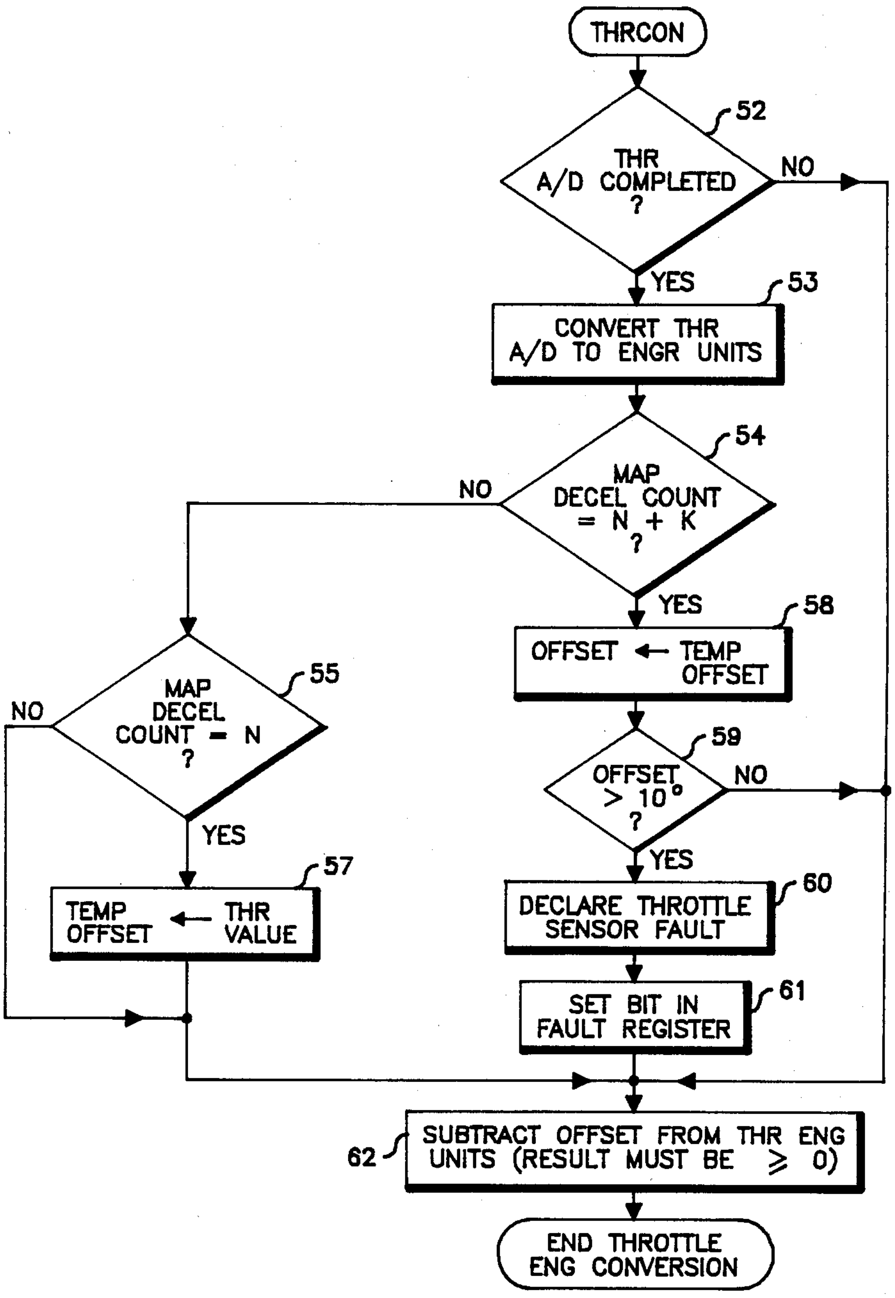
FIG. 3 is a flowchart of the operation of the invention as embodied in programmable form.

The flowchart of FIG. 3 represents the relevant portion of a longer flowchart relating to an entire fuel injection and spark advance system. In an engine control program, as known in the art, there are two main parts, termed the "foreground" and "background". The foreground includes interrupt service routines for performing input and output operations. Included in these is the A/D conversion of a throttle position signal. The subseqent conversion of the digital signal to engineering units takes place in the background.

The reading of the throttle position at terminal 24 is checked at decision block 52 to be sure that the A/D conversion is completed. Until this conversion is complete, the circuit will continue to use the already-stored error factor. In process block 53, the digital throttle position number is then converted to "engineering units" representing throttle position expressed in degrees of rotation. Engineering units are widely used in the automobile industry in software-controlled systems to correspond with automotive engineering terminology. In the next decision block 54, the number of clock pulses is examined. As noted in FIG. 2, the clock pulses (terminal 48) may be derived from a time-based clock source or from a sensor of crankshaft revolutions. The constants "n" and "k" may, in this embodiment, be 1 and 1.5 crankshaft revolutions respectively. In accordance with decision blocks 54 and 55, if n pulses have been counted, but not n+k, the error correction factor in the temporary storage 26 (TEMP OFFSET) is changed to the new value of throttle angle (process block 57). In accordance with decision block 54, if n+k pulses have occurred, the value stored in the temporary storage is transferred to the semi-permanent storage 30 as "offset" (processed block 58). A new entry into the storage 30 automatically overrides or erases the previous entry.

In the next decision block 59, the value in the semi-permanent storage is examined and if the value is greater than the predetermined limit (error limit reference 40); e.g., greater than 10 degrees in this embodiment, a throttle sensor fault or error is declared (process block 60) and an error signal is sent (process block 61) to a fault register. This register entry may also activate a warning lamp on the dash board lamp panel so that the driver will obtain service on the control system. In either event, the previously stored error correction factor is maintained in the storage element 30. The number stored in storage element 30 is substracted (process block 62) from the converted signals (process block 53), and the resultant, corrected throttle position reading is utilized in the remainder of the system.

Thus there has been shown and described a self-correcting arrangement providing a signal in response to throttle position. While described in the environment of an electronic fuel injection/ignition system, the invention is clearly applicable in any system for detecting and correcting small but critical errors in a measured quantity. In order to utilize the invention, one set of conditions must be known which should provide a unique value for the measured quantity. If the quantity is measured each time that the one set of conditions occurs, and the unique value is subtracted from the measured value, the difference value may be stored as an error correction factor and can be subtracted from subsequent readings under other conditions. In the present embodiment, the unique value is a zero reading at a zero angle of the throttle. Any reading other than zero under conditions which should provide a zero reading may be considered an error and may be used as a correction factor.

Other variations and modifications of the present invention are possible and it is intended to cover all such that fall within the scope of the appended claims.

What is claimed is:

1. A self-correcting position sensor circuit for providing an output signal in response to the instantaneous position of a movable element with respect to a reference position and comprising:

first position sensor means adjacent said movable element for measuring the position of the element and providing a first sensor circuit signal in response to the instantaneous position of the element;

second sensor means for providing a second sensor signal in response to a parameter other than said measured position, said parameter having a predetermined value at said reference position;

comparator means coupled to the second sensor means for providing a first control signal in response to a determination that the second sensor signal is of the predetermined value;

storage means coupled to the first position sensor means for storing the first sensor signal;

switching control circuitry coupled to the comparator means and to the storage means and including switching means for controlling the storage of the first sensor signal in the storage means in response to the first control signal; and subtracting means coupled to the first sensor means and to the storage means for subtracting the stored value of the first sensor signal from the instantaneous values of the first sensor signal and for providing said output signal.

2. A self-correcting position sensor circuit according to claim 1 wherein the comparator means includes reference means for providing a reference threshold signal, and a comparator for comparing the second sensor signal with the threshold signal.

3. A self-correcting position sensor circuit according to claim 1 and including second storage means and wherein the switching control circuitry further includes second switching means, first and second delay means coupled between the comparator means and first and second switching means respectively, and the delay of the first delay means is longer than the delay of the second delay means, and the second storage means is coupled to receive the output of the second switching means and is coupled to the input of the first switching means.

4. A self-correcting position sensor circuit according to claim 3 and wherein the switching control circuitry further includes inverter means coupled to the output of the comparator means and wherein the inverter output signal is coupled to the first and second delay means for clearing said delay means.

5. A self-correcting position sensor circuit according to claim 1 wherein the movable element is an engine throttle element, the first sensor signal is a measure of the throttle opening, said parameter is the manifold absolute pressure and the second sensor signal is a measure of the pressure.

* * * * *